(12) United States Patent
Meisner et al.

(10) Patent No.: US 8,720,258 B2
(45) Date of Patent: May 13, 2014

(54) MODEL BASED ENGINE INLET CONDITION ESTIMATION

(71) Applicant: United Technologies Corporation, Hartfort, CT (US)

(72) Inventors: Richard P. Meisner, Glastonbury, CT (US); Alexandra I. Britten, Ansonia, CT (US); Stefan M. Poth, Jr., South Windsor, CT (US); Boris Karpman, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/631,359

(22) Filed: Sep. 28, 2012

(65) Prior Publication Data

US 2014/0090456 A1 Apr. 3, 2014

(51) Int. Cl.
*G01M 15/14* (2006.01)
(52) U.S. Cl.
USPC .......................................................... 73/112.01
(58) Field of Classification Search
USPC .......................................................... 73/112.01
See application file for complete search history.

(56) References Cited

U.S. PATENT DOCUMENTS

| | | | |
|---|---|---|---|
| 6,823,675 B2 | 11/2004 | Brunell et al. | |
| 7,216,071 B2 | 5/2007 | Volponi | |
| 7,219,040 B2 | 5/2007 | Renou et al. | |
| 7,603,222 B2 * | 10/2009 | Wiseman et al. | 701/100 |
| 7,822,512 B2 | 10/2010 | Thatcher et al. | |
| 7,837,429 B2 | 11/2010 | Zhang et al. | |
| 7,908,072 B2 * | 3/2011 | Tonno et al. | 701/100 |
| 8,090,456 B2 * | 1/2012 | Karpman et al. | 700/45 |
| 8,131,384 B2 * | 3/2012 | Karpman et al. | 700/45 |
| 8,171,717 B2 | 5/2012 | Mosley et al. | |
| 8,215,095 B2 | 7/2012 | Mosely | |
| 8,285,468 B2 * | 10/2012 | Tonno et al. | 701/100 |
| 8,315,741 B2 * | 11/2012 | Karpman et al. | 700/282 |
| 8,523,102 B2 * | 9/2013 | Shue et al. | 244/17.13 |
| 2004/0123600 A1 * | 7/2004 | Brunell et al. | 60/773 |
| 2005/0193739 A1 | 9/2005 | Brunell et al. | |
| 2008/0243352 A1 | 10/2008 | Healy | |
| 2011/0052370 A1 * | 3/2011 | Karpman et al. | 415/13 |
| 2012/0060505 A1 | 3/2012 | Fuller et al. | |

* cited by examiner

*Primary Examiner* — Freddie Kirkland, III
(74) *Attorney, Agent, or Firm* — Kinney & Lange, P.A.

(57) ABSTRACT

A gas turbine engine inlet sensor fault detection and accommodation system comprises an engine model, an engine parameter comparison block, an inlet condition estimator, control laws, and a fault detection and accommodation system. The engine model is configured to produce a real-time model-based estimate of engine parameters. The engine parameter comparison block is configured to produce residuals indicating the difference between the real-time model-based estimate of engine parameters and sensed values of the engine parameters. The inlet condition estimator is configured to iteratively adjust an estimate of inlet conditions based on the residuals. The control laws are configured to produce engine control parameters for control of gas turbine engine actuators based on the inlet conditions. The fault detection and accommodation system is configured to detect faults in inlet condition sensors, select sensed inlet conditions for use by the control laws in the event of no fault, and select estimated inlet conditions for use by the control laws in the event of inlet condition sensor fault.

19 Claims, 3 Drawing Sheets

MODEL BASED ENGINE INLET CONDITION ESTIMATION

BACKGROUND

The present invention relates generally to gas turbine engine monitoring, and more particularly to a system of fault detection and accommodation for faults in engine inlet condition sensors.

In aircraft gas turbine engines such as turbojets and turbofans, it is necessary to monitor inlet pressure and temperature in order to accurately control engine net thrust and manage compressor/combustor operability and hot section part life. In addition, inlet temperature and pressure readings are used to detect and avoid icing and other dangerous inlet conditions. Conventional aircraft gas turbine engine control systems include dedicated pressure and temperature sensors configured to monitor inlet conditions. Inlet condition sensor faults can give rise to false pressure and/or temperature readings that may lead to incorrect engine control resulting in failure to achieve required thrust, operability and/or life.

SUMMARY

The present invention is directed toward a gas turbine engine inlet sensor fault detection and accommodation system comprising an engine model, an engine parameter comparison block, an inlet condition estimator, control laws, and a fault detection and accommodation system. The engine model is configured to produce a real-time model-based estimate of engine parameters. The engine parameter comparison block is configured to produce residuals indicating the difference between the real-time model-based estimate of engine parameters and sensed values of the engine parameters. The inlet condition estimator is configured to iteratively adjust an estimate of inlet conditions based on the residuals. The control laws are configured to produce engine control parameters for control of gas turbine engine actuators based on the inlet conditions. The fault detection and accommodation system is configured to detect faults in inlet condition sensors, select sensed inlet conditions for use by the control laws in the event of no fault, and select estimated inlet conditions for use by the control laws in the event of inlet condition sensor fault.

DETAILED DESCRIPTION

Figure 1:
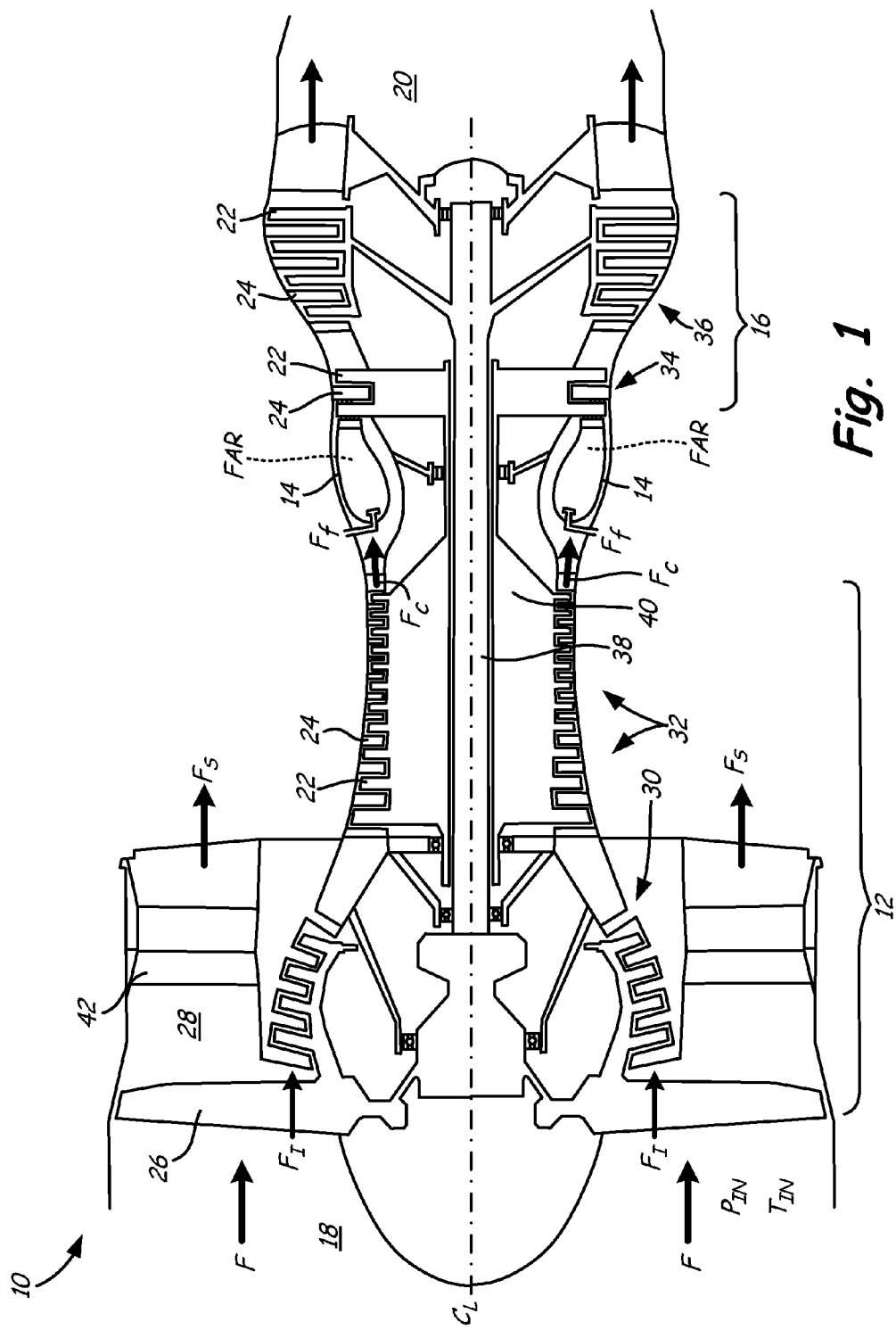
FIG. 1 is a simplified cross-sectional view of a gas turbine engine.

FIG. 1 is a cross-sectional view of gas turbine engine 10. Gas turbine engine 10 comprises compressor section 12, combustor 14, and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also be provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ at inlet 18 is characterized by inlet pressure $P_{In}$ and inlet temperature $T_{In}$. Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. Fan rotor 26 may also function as a first-stage compressor for gas turbine engine 10, and LPC 30 may be configured as an intermediate compressor or booster. Gas turbine engine 10 may be embodied in a wide range of different shaft, spool and turbine engine configurations, including one, two and three-spool turboprop and (high or low bypass) turbofan engines, turboshaft engines, turbojet engines, and multi-spool industrial gas turbines.

Engine control for gas turbine engine control (via, for instance, a full authority digital engine controller or FADEC) relies on accurate measurements of a variety of engine and environmental parameters, including inlet pressure $P_{In}$ and inlet temperature $T_{In}$. Depending on the engine control system, $P_{In}$ and $T_{In}$ may be used to retrieve control values or model constants from a lookup table for fuel flow metering, variable vane geometry actuation, and other controllable parameters. In alternative embodiments, $P_{In}$ and $T_{In}$ may be inputs for real-time model-based control. Inlet pressure $P_{In}$ and inlet temperature $T_{In}$ may, for instance, be critical variables for predicting and avoiding compressor stall and combustor blowout. Inlet pressure $P_{In}$ and inlet temperature $T_{In}$ are measured by onboard sensors. Fault detection and accommodation system 100 (see FIG. 2, described below) detects faults in these sensors, and provides estimated values of inlet pressure $P_{In}$ and inlet temperature $T_{In}$ as a backup in case of sensor malfunction.

Figure 2:
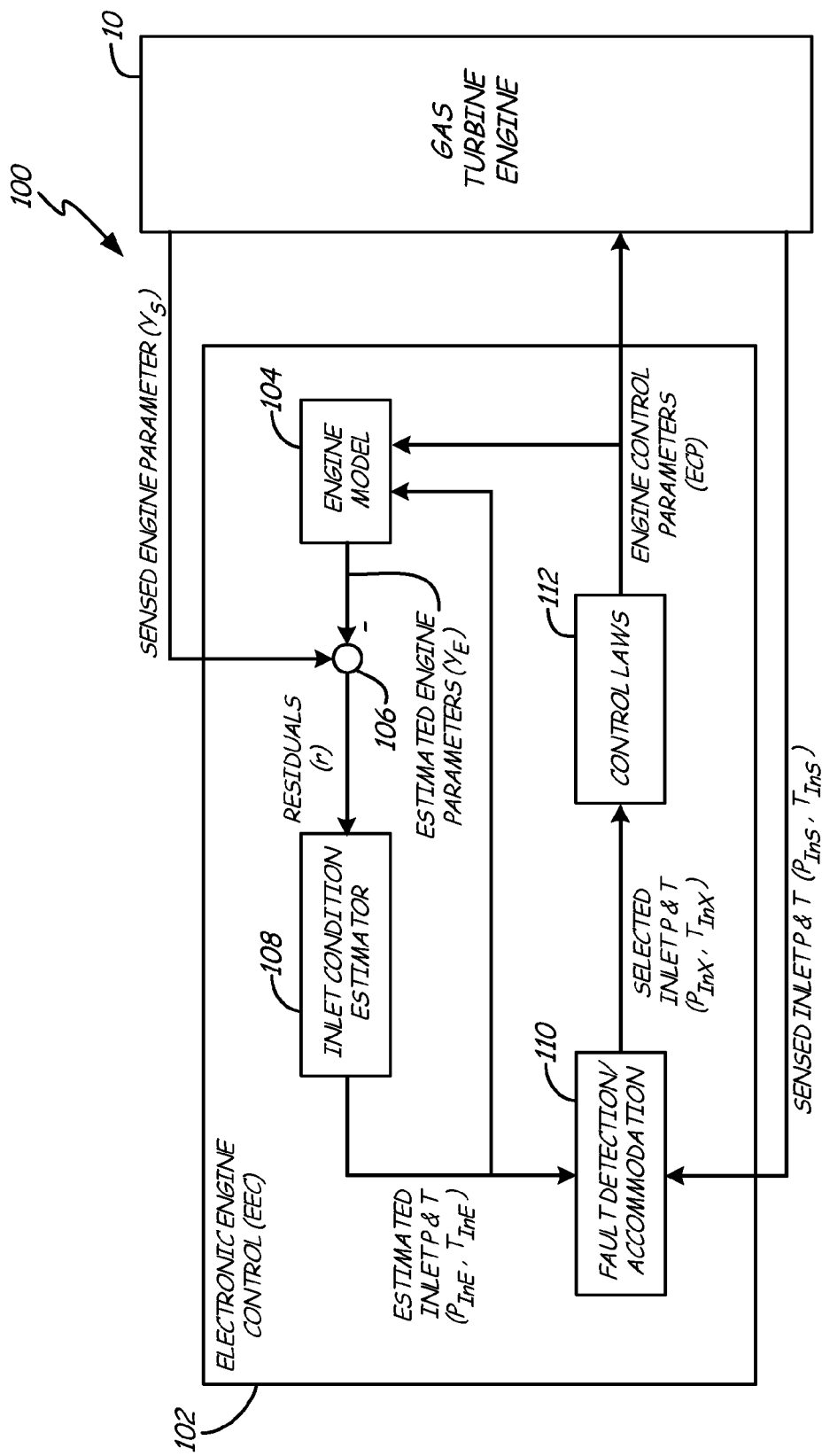
FIG. 2 is a schematic block diagram of fault detection and accommodation system with inlet condition estimation for the gas turbine engine of FIG. 1.

FIG. 2 is a schematic block diagram of fault detection and accommodation system 100, comprising gas turbine engine 10 and electronic engine control 102 with engine model 104, engine parameter comparison block 106, inlet condition estimator 108, fault detection and accommodation block 110, and control laws 112. As described above with respect to FIG.

1, fault detection and accommodation system 100 allows the electronic engine control to identify and accommodate faults in inlet condition sensors such as pressure and temperature sensors. The logic flow paths indicated in FIG. 2 reflect one time step in an iteratively repeating real time control process.

Electronic engine control system 102 is a digital controller that specifies engine control parameters ECP for actuator systems of gas turbine engine 10 according to control laws 112, and based on a plurality of sensed and/or estimated engine and environmental parameters including inlet pressure $P_{In}$ and inlet temperature $T_{In}$. In particular, electronic engine control system 102 receives sensed values $P_{InS}$ and $T_{InS}$ of inlet pressure and temperature, respectively, and simultaneously produces estimates $P_{InE}$ and $T_{InE}$ of inlet pressure and temperature. These sensed and estimated values are compared to detect sensor faults, and estimated values are substituted for sensed values in the event of sensor failure.

Electronic engine control system 102 is comprised of five sections: engine model 104, engine parameter comparison block 106, inlet condition estimator 108, fault detection and accommodation block 110, and control laws 112. These logic blocks represent distinct processes performed by electronic engine control 102, but may share common hardware. Engine model 104, engine parameter comparison block 106, inlet condition estimator 108, fault detection and accommodation block 110, and control laws 112 may be logically separable software algorithms running on a shared processor or multiple parallel processors of a full authority digital engine controller (FADEC) or other computing device.

Engine model 104 is a logical block incorporating a model of gas turbine engine 10. In some embodiments, engine model 104 may be a component-level model describing only compressor section 12. In other embodiments, engine model 104 may be a system-level model describing the entirety of gas turbine engine 10. Engine model 104 may, for instance, be constructed based on the assumption that specific heats and gas constants within gas turbine engine 10 remain constant over one timestep. Similarly, engine model 104 may incorporate simplifying assumptions that unaccounted pressure losses across gas turbine engine 10 and torque produced by cooling bleed mass flow are negligible. The particular simplifying assumptions used by engine model 104 are selected for high accuracy during normal modes of operation of gas turbine engine 10, and may not hold during some exceptional operating conditions such as engine surge.

Engine model 104 receives a plurality of engine parameter inputs including previous timestep estimates of inlet pressure $P_{InE}$ and inlet temperature $T_{InE}$, and engine control parameters ECP corresponding to actuator states specified by control laws 112. Engine control parameters ECP may, for instance, include fuel flow rates into combustor 14, variable compressor bleed values, angle of attack on variable geometry compressor stator vanes, and variable nozzle area. Engine model 104 may also be programmed with installation inputs (not shown; e.g. bleeds for cabin cooling) that are substantially constant or independent of engine operation. Engine model 104 is a real time model describing relationships between these engine parameter inputs and a series of estimated engine parameters $Y_E$. Engine model 104 may, for instance, be a piecewise linear state variable model or a component-level aerothermodynamic model. Estimated engine parameters $Y_E$ are generated in the form of a vector by engine model 104, and may comprise a mixture of unmodified engine parameter inputs and dependent variables estimated in real time based on engine parameter inputs using engine model 104. Estimated engine parameters $Y_E$ may, for instance, include rotor speeds of low pressure shaft 38 and high pressure shaft 40, pressure values at points within compressor section 12, and exhaust gas temperatures.

Engine parameter comparison block 106 compares estimated engine parameters $Y_E$ from sensed engine parameters $Y_S$ to yield residuals r. Sensed engine parameters $Y_S$ parallel estimated engine parameters $Y_E$, but are taken from appropriate sensors distributed within gas turbine engine 10. In one embodiment, residuals r take the form of a vector comprising error values indicating a difference between estimated engine parameters $Y_E$ and sensed engine parameters $Y_S$. Inlet condition estimator 108 produces estimates $P_{InE}$ and $T_{InE}$, of inlet pressure $P_{In}$ and inlet temperature $T_{In}$ recursively, such that:

$$P_{InE} = P_{InE(last)} + \Delta P_{In}; \text{ and} \qquad \text{[Equation 1]}$$

$$T_{InE} = T_{InE(last)} + \Delta T_{In}; \qquad \text{[Equation 2]}$$

where $P_{InE(last)}$ and $T_{InE(last)}$ are estimated values of inlet pressure and temperature, respectively, from a previous timestep. For the first timestep, initial estimates of $P_{InE(last)}$ and $T_{InE(last)}$ may be provided from a lookup table based, e.g., on altitude. $\Delta P_{In}$ and $\Delta T_{In}$ represent change in inlet pressure and temperature, respectively, since the previous timestep, and are defined as:

$$\Delta P_{In} = k_P r; \text{ and} \qquad \text{[Equation 3]}$$

$$\Delta T_{In} = k_T r \qquad \text{[Equation 4]}$$

where $k_P$ and $k_T$ are gain vectors selected to produce change in pressure and temperature, respectively, as a linear combination of residuals r. Gain vectors $k_P$ and $k_T$ are selected to provide a minimum variance estimate of inlet pressure and temperature, respectively, i.e. to minimize propagation of uncertainty in sensed and estimated engine parameters $Y_S$ and $Y_E$, respectively. Gain vectors $k_P$ and $k_T$ change in real time as a function of engine state. In some embodiments, gain vectors $k_P$ and $k_T$ are retrieved from a lookup table by one or more engine state parameters (e.g. a subset of sensed engine parameter $Y_S$ and/or estimated engine parameters $Y_E$). In other embodiments, gain vectors $k_P$ and $k_T$ are produced in real time by engine model 104.

Fault detection and accommodation block 110 receives both estimated inlet pressure and temperature values $P_{InE}$ and $T_{InE}$, and sensed inlet pressure and temperature values $P_{InS}$ and $T_{InS}$, respectively. Fault detection and accommodation block 110 identifies probable sensor faults, selects either sensed or estimated inlet conditions based on the presence of absence of sensor fault conditions, and forwards selected sensed or estimated inlet pressure and temperature values to control laws 112. In particular, fault detection and accommodation block 110 selects and forwards sensed pressure and temperature values $P_{InS}$ and $T_{InS}$ whenever no fault is flagged, and forwards estimated pressure and temperature values $P_{InE}$ and $T_{InE}$ as backup values whenever a fault is flagged. Pressure and temperature values may be selected separately; fault detection and accommodation block 110 may, for instance, select and forward sensed inlet pressure $P_{InS}$ together with estimated inlet temperature $T_{InS}$ in the event of a temperature sensor fault.

Fault detection and accommodation block 110 may identify sensor fault conditions in a variety of ways. In some embodiments, fault detection and accommodation block 110 flags a sensor fault if values of $P_{InS}$ and/or $T_{InS}$ values fall outside of absolute allowable ranges. In other embodiments, fault detection and accommodation block 110 flags a sensor fault if change in $P_{InS}$ and/or $T_{InS}$ between timesteps or across multiple timesteps exceeds a threshold value. Fault detection and accommodation block 110 may aggregate or average values or rates of change of $P_{InS}$ and/or $T_{InS}$, and flag a fault if aggregated or average values fall outside of permissible ranges. In general, permissible transient abnormalities in value or change in $P_{InS}$ and/or $T_{InS}$ may be greater in magnitude than permissible persistent deviations from expected values. Thus, fault limits for aggregate or average values may be stricter (i.e. narrower) than for instantaneous values. Fault detection and accommodation block 110 may additionally flag faults if absolute value or rate of change in sensed inlet pressure $P_{InS}$ and/or temperature $T_{InS}$ deviates from estimated inlet pressure and/or temperature $P_{InE}$ and/or $T_{InE}$ by more than a threshold value. In particular, fault detection and accommodation block 110 may flag faults if this deviation persists for multiple timesteps. Fault detection and accommodation block 110 may utilize any combination of the aforementioned fault detection methods.

Control laws 112 specify engine control parameters ECP according to inlet pressure and temperature values selected by fault accommodation block 110 (i.e. $P_{InE}$ or $P_{InS}$ and $T_{InE}$ or $T_{InE}$). Control laws 112 may receive a wide variety of additional inputs reflecting other parameters of gas turbine engine 10, environmental parameters, and static or quasi-static calibration parameters. Engine control parameters ECP control actuators in gas turbine engine 10, including actuators of variable geometry stator vanes, variable bleed valves, and nozzles. Engine control parameters ECP are also forwarded to engine model 104 along with estimated inlet pressure and temperature $P_{InE}$ and $T_{InE}$ in preparation for producing estimated engine parameters $Y_E$ in the next timestep.

Figure 3:
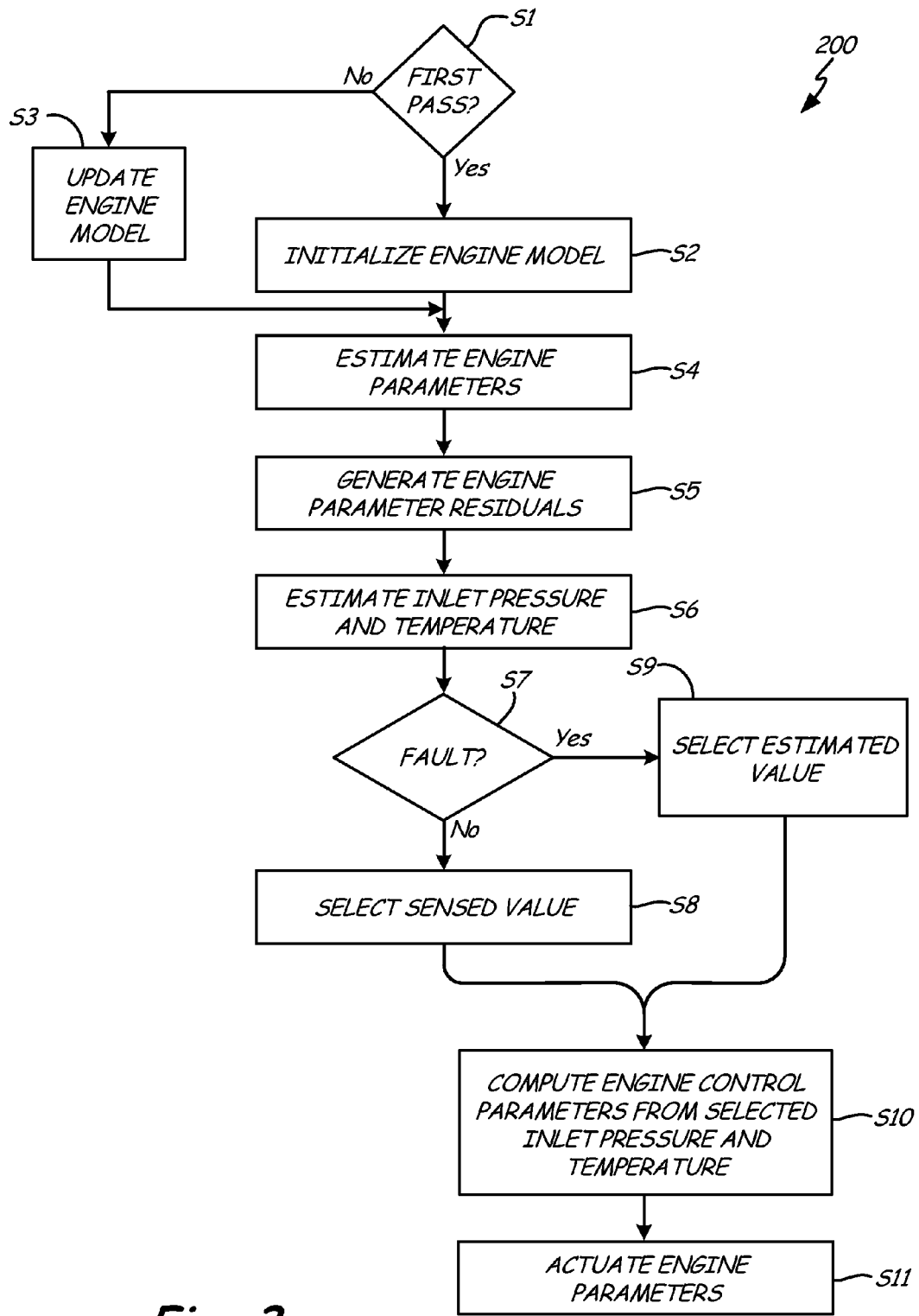
FIG. 3 is a flowchart of a method performed by fault detection and accommodation system of FIG. 2.

FIG. 3 is a flowchart of fault detection and accommodation method 300, an exemplary method carried out by fault detection and accommodation system 100 to identify and accommodate faults in inlet pressure and temperature sensors. Fault detection and accommodation method 300 may be repeated many times during operation of fault detection and accommodation system 100. Method 300 differentiates between first and subsequent passes. (Step S1). In the first iteration of method 300, engine model 104 is initialized using measured or approximate values of inlet pressure and temperature. (Step S2). In subsequent iterations of method 300, engine model 104 is updated using engine control parameters ECP and inlet pressure and temperature estimates $P_{InE}$ and $T_{InE}$ produced in previous passes. (Step S3)

Engine model 104 produces estimated engine parameters $Y_E$ (Step S4), which are compared with corresponding sensed engine parameters $T_S$ to generate residuals r (Step S5). Inlet condition estimator 108 estimates inlet pressure and temperature values $P_{InE}$ and $T_{InE}$ by iteratively adjusting previous values using residuals r and gain vectors $k_P$ and $k_T$, as described in Equations 1-4. (Step S6). For the first iteration of step S4, previous timestep pressure and temperature values $P_{InE(last)}$ and $T_{InE(last)}$ are approximated using a lookup table or fixed value based, e.g., on altitude. For subsequent iterations of step S4, the previous timestep estimate of $P_{InE}$ and $T_{InE}$ is used, instead.

Fault detection and accommodation block 110 identifies faults in inlet pressure and temperature sensors based on values or rates of change of $P_{InS}$ and/or $T_{InS}$, and/or based on comparison of sensed with estimated values. (Step S7). Fault detection and accommodation block 110 forwards sensed or estimated values of inlet parameters to command laws 112, depending on sensor fault state. If fault detection and accommodation block 110 flags a fault in a sensor, the corresponding estimated value is selected for forwarding as a replacement. (Step S9). Otherwise, the sensed value is forwarded instead, as sensed values are ordinarily more accurate than estimated values. (Step S8). Control laws 112 compute engine control parameters ECP based on selected values of compressor inlet temperature and pressure. (Step S10). Engine control parameters ECP are used to actuate engine parameters as described above with respect to FIG. 2. (Step S11).

Fault detection and accommodation system 100 detects faults in compressor inlet condition sensors and provides backup estimated values of inlet pressure $P_{In}$ and inlet temperature $T_{In}$ for use in case of sensor malfunction. In this way, fault detection and accommodation system 100 allows gas turbine engine 10 to continue operating at substantially undiminished efficiency through sensor faults. Estimated inlet pressure and temperature $P_{InE}$ and $T_{InE}$ can also be used to increase the accuracy and reliability of sensor fault detection, as described above with respect to FIG. 1, thereby reducing the probability of an undetected fault leading to incorrect control action.

While the invention has been described with reference to an exemplary embodiment(s), it will be understood by those skilled in the art that various changes may be made and equivalents may be substituted for elements thereof without departing from the scope of the invention. In particular, although the present invention has been described with respect to the sensing and estimation of inlet pressure and temperature, other inlet parameters such as humidity may analogously be estimated. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The status of the claims is as follows:

1. A gas turbine engine inlet sensor fault detection and accommodation system comprising:
   an engine model configured to produce a real-time model-based estimate of engine parameters;
   an engine parameter comparison block configured to produce residuals indicating the difference between the real-time model-based estimate of engine parameters and sensed values of the engine parameters;
   an inlet condition estimator configured to iteratively adjust an estimate of inlet conditions based on the residuals;
   control laws configured to produce engine control parameters for control of gas turbine engine actuators based on the inlet conditions; and
   a fault detection and accommodation system configured to detect faults in inlet condition sensors, select sensed inlet conditions for use by the control laws in the event of no fault, and select estimated inlet conditions for use by the control laws in the event of inlet condition sensor fault.

2. The gas turbine engine inlet sensor fault detection and accommodation system of claim 1, wherein the engine model is configured to the produce real-time model-based estimate engine parameters based on a previous iteration estimate of inlet conditions, and based on engine control parameters.

3. The gas turbine engine inlet sensor fault detection and accommodation system of claim 1, wherein the inlet conditions include compressor inlet temperature and compressor inlet pressure.

4. The gas turbine engine inlet sensor fault detection and accommodation system of claim 1, wherein the engine model receives engine control parameters, and updates for a next timestep using the engine model.

5. The gas turbine engine inlet sensor fault detection and accommodation system of claim 1, wherein the engine control parameters include at least one of a rotor speed, a combustor pressure, and an exhaust gas temperature.

6. The gas turbine engine inlet sensor fault detection and accommodation system of claim 1, wherein the fault detection and accommodation system detects faults by flagging a fault when a value or a rate of change of a value of at least one of the sensed inlet conditions falls outside of a specified range.

7. The gas turbine engine inlet sensor fault detection and accommodation system of claim 1, wherein the fault detection and accommodation system detects faults by flagging a fault when the sensed inlet conditions differ by more than a threshold value from the estimated inlet conditions.

8. The gas turbine engine inlet sensor fault detection and accommodation system of claim 1, wherein the inlet condition estimator iteratively adjusts the estimate of the inlet conditions by adjusting a previous timestep estimate of the inlet conditions by a function of the residuals and a realtime variable vector gain.

9. The gas turbine engine inlet sensor fault detection and accommodation system of claim 8, wherein the realtime variable vector gain is retrieved from a lookup table.

10. The gas turbine engine inlet sensor fault detection and accommodation system of claim 8, wherein the realtime variable vector gain is estimated using the engine model.

11. A method for accommodating faults among inlet sensors on a gas turbine engine, the method comprising:
    sensing engine inlet conditions at an inlet of the gas turbine engine;
    iteratively producing a real-time model-based estimate of engine inlet conditions;
    identifying faults in the inlet sensors; and
    utilizing the estimated engine inlet conditions to produce engine control parameters in the event of a fault, and the sensed engine inlet conditions otherwise.

12. The method of claim 11, wherein identifying faults in the inlet sensors comprises flagging a fault whenever a value of the sensed engine inlet conditions or a rate of change of the sensed engine inlet conditions falls outside of a predefined range.

13. The method of claim 12, wherein identifying faults in the inlet sensors comprises flagging a fault whenever a value of the sensed engine inlet conditions or a rate of change of the sensed engine inlet conditions falls outside of a predefined range in aggregate or on average over several timesteps of the method.

14. The method of claim 11, wherein identifying faults in the inlet sensors comprises flagging a fault whenever a value of the sensed engine inlet conditions differs from a corresponding value of the estimated inlet conditions by more than a predefined amount.

15. The method of claim 14, wherein identifying faults in the inlet sensors comprises flagging a fault whenever a value of the sensed engine inlet conditions differs from a corresponding value of the estimated inlet conditions by more than a predefined amount in aggregate or on average over several timesteps of the method.

16. The method of claim 11, wherein the gas turbine inlet conditions are gas turbine compressor inlet temperature and pressure.

17. The method of claim 11, wherein iteratively producing a real-time model-based estimate of engine inlet conditions comprises forming residuals from a difference between sensed engine parameters and real-time model-based estimates of corresponding engine parameters, and adjusting previous timestep estimates of inlet conditions based on the residuals and a vector gain.

18. The method of claim 17, wherein the vector gain is retrieved in real time from a lookup table.

19. The method of claim 17, wherein the vector gain is computed in real time using a gas turbine engine model.

\* \* \* \* \*